(12) United States Patent
Krumphals

(10) Patent No.: US 7,084,732 B2
(45) Date of Patent: Aug. 1, 2006

(54) ELECTROCERAMIC COMPONENT COMPRISING INNER ELECTRODES

(75) Inventor: Robert Krumphals, Deutschlandsberg (AT)

(73) Assignee: Epcos AG, Munich (DE)

( * ) Notice: Subject to any disclaimer, the term of this patent is extended or adjusted under 35 U.S.C. 154(b) by 0 days.

(21) Appl. No.: 10/502,197

(22) PCT Filed: Jan. 22, 2003

(86) PCT No.: PCT/DE03/00169

§ 371 (c)(1),
(2), (4) Date: Mar. 4, 2005

(87) PCT Pub. No.: WO03/063185

PCT Pub. Date: Jul. 31, 2003

(65) Prior Publication Data

US 2005/0146909 A1   Jul. 7, 2005

(30) Foreign Application Priority Data

Jan. 25, 2002   (DE) .............................. 102 02 915

(51) Int. Cl.
*H01C 7/10* (2006.01)

(52) U.S. Cl. ..................... 338/22 R; 338/204

(58) Field of Classification Search .................. 338/20, 338/21, 54, 204, 22 R, 295, 314; 361/306.3, 361/321.2

See application file for complete search history.

(56) References Cited

U.S. PATENT DOCUMENTS

| | | | |
|---|---|---|---|
| 5,075,665 A | | 12/1991 | Taira et al. |
| 5,099,387 A | * | 3/1992 | Kato et al. |
| 5,159,300 A | * | 10/1992 | Nakamura et al. |
| 5,245,309 A | | 9/1993 | Kawase et al. |
| 5,495,387 A | * | 2/1996 | Mandai et al. |
| 5,583,738 A | * | 12/1996 | Kohno et al. |
| 6,008,717 A | | 12/1999 | Kawase et al. |
| 6,115,234 A | * | 9/2000 | Ishii et al. |
| 6,184,769 B1 | * | 2/2001 | Nakamura et al. |
| 6,346,871 B1 | * | 2/2002 | Ogasawara et al. |
| 6,525,628 B1 | * | 2/2003 | Ritter et al. ............... 333/172 |
| 6,608,547 B1 | | 8/2003 | Greier et al. |
| 2003/0024474 A1 | * | 2/2003 | Barris et al. ............... 333/174 |

FOREIGN PATENT DOCUMENTS

| | | |
|---|---|---|
| DE | 3930000 | 3/1990 |
| DE | 4207915 | 9/1992 |
| DE | 19806296 | 9/1998 |
| DE | 19931056 | 1/2001 |
| EP | 1058276 | 12/2000 |
| JP | 09129477 | 5/1997 |
| WO | WO02/11160 | 2/2002 |

* cited by examiner

*Primary Examiner*—Tu Hoang
(74) *Attorney, Agent, or Firm*—Fish & Richardson P.C.

(57) ABSTRACT

An electrical component includes a ceramic base made up of ceramic layers, electrode levels between the ceramic layers, where each electrode level includes at least two electrodes, and contact surfaces on an outer surface of the ceramic base. The contact surfaces are electrically connected to the electrodes. Electrodes overlap that are on different electrode levels and that are connected to different contact surfaces.

19 Claims, 3 Drawing Sheets

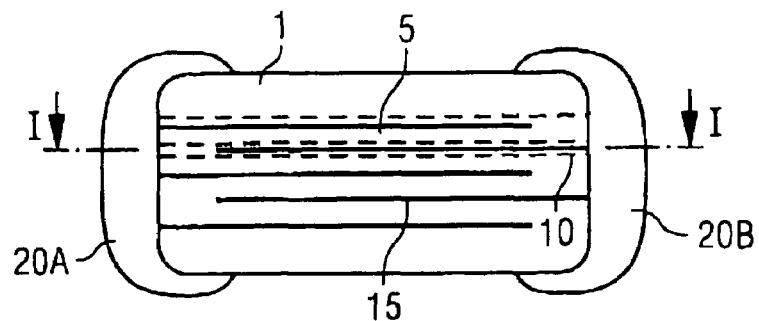
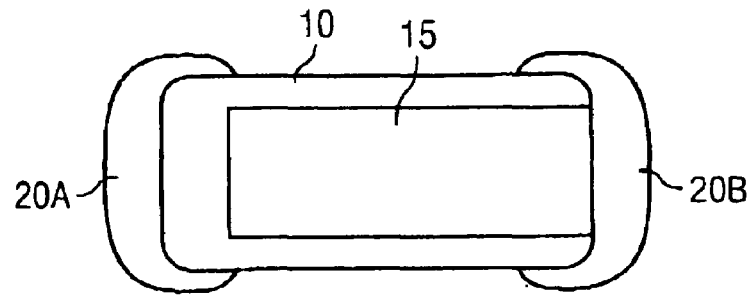
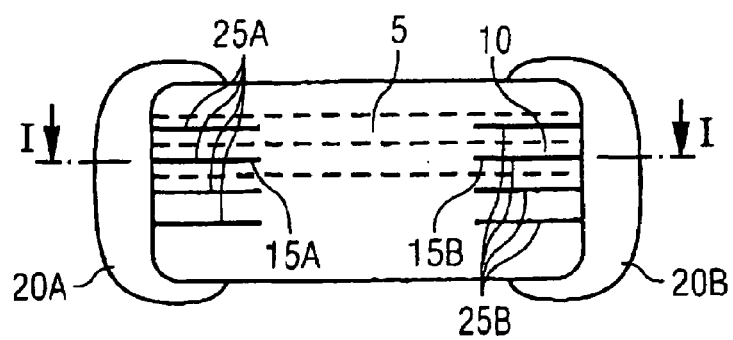
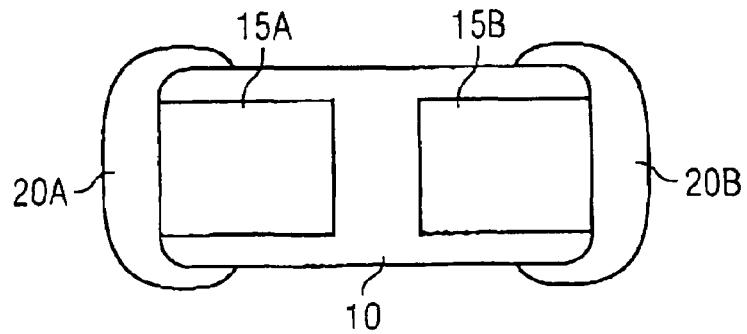

ELECTROCERAMIC COMPONENT COMPRISING INNER ELECTRODES

BACKGROUND

Examples of electrical components having a ceramic base body and internal electrodes are thermistors and varistors. The base body of varistors is frequently produced from a mixture of different metal oxides, for example, from zinc oxide. Varistors demonstrate a non-linear, voltage-dependent change in resistance, which is used to protect an electronic circuit against over-voltage. In this process, the resistance value of varistors decreases with an increasing voltage that is applied.

In the diversion of electrical over-voltage pulses by the varistor, the energy of the pulse must be absorbed by the ceramic base body. Particularly in the case of short voltage pulses, strong local heating of the ceramic base body occurs between the internal electrodes. In this process, temperature equalization with the environment is not possible. This results in great temperature differences, which bring about mechanical stresses in the ceramic base body. In this process, the internal electrode causes further weakening of the cross-sectional area of the ceramic base body. For this reason, cracks can occur in the ceramic body, in case of severe local heating of the varistor, and these can result in ceramic parts coming loose from the base body.

Conventional varistors have two contact surfaces on the faces of their base bodies. Internal electrodes are arranged in the interior of the base body, which, in cross-section, are pushed into one another in chamber-like manner through all levels, wherein the internal electrodes are each alternately connected with a contact surface of different polarity (see FIG. 1A). A cross-section through the base body of the varistor along a ceramic layer shows that a major portion of the surface of this layer is taken up by the internal electrode (see FIG. 1b). This results in weakening of the ceramic body in this region, so that in case of a large electrical pulse, crack formation must be expected in the ceramic base body, due to over-heating.

A different variant of varistors is known from the publication DE 199 31 056 A1, in which internal electrodes are arranged in such a manner that two electrode stacks that do not overlap with one another are formed, in each instance, each of which contacts a contact surface (see FIG. 2A). A cross-section through the ceramic base body along a ceramic layer shows that two internal electrodes 15A, 15B, which lie opposite one another, are arranged on a ceramic layer (see FIG. 2B). In the case of a large electrical pulse, local over-heating occurs also in the case of varistors having this construction, and this can result in fracture of the base body.

An NTC thermistor element is known from the published patent application DE 198 06 296 A1, which has at least one ceramic layer on which a longer and a shorter internal electrode are arranged, the ends of which are opposite one another, spaced apart. In this arrangement, the internal electrodes can overlap, if they are connected with the same contact surface arranged on the outer surface of the component, or also internal electrodes can overlap if they are connected with different contact surfaces. In the case of this thermistor element, as well, crack formation in the ceramic base body can be expected in case of a large electrical pulse.

SUMMARY

It is therefore the object of the present invention to provide an electrical component having a ceramic base body and internal electrodes, which can absorb an electrical pulse well, and, at the same time, demonstrates increased mechanical stability as compared with the state of the art.

This object is achieved, according to the invention, via a component according to claim 1. Advantageous embodiments of the component are the object of dependent claims.

The invention relates to an electrical component having a ceramic base body, which comprises a sequence of ceramic layers, as well as several internal electrodes arranged on the ceramic layers, where at least two internal electrodes are arranged on a first ceramic layer and form a first electrode level. At least two additional internal electrodes are arranged on a second ceramic layer, and form a second electrode level. Furthermore, two contact surfaces are arranged on the outer surface of the ceramic base body, which are connected with the internal electrodes in an electrically conductive manner. In this arrangement, only internal electrodes that are connected with a different contact surface, in each instance, and are, at the same time, arranged on adjacent first and second ceramic layers, overlap.

A component according to the invention demonstrates an increased pulse resistance as compared with a conventional component. This is particularly attributable to two characteristics of the component according to the invention. For one thing, internal electrodes that are connected with different contact surfaces, in other words, that demonstrate different polarity, overlap. This ensures that the energy of an electrical pulse can be absorbed on a large area in the interior of the component. Furthermore, a component according to the invention has at least two internal electrodes on a ceramic layer, which has the result that the cross-sectional area of the ceramic base body, corresponding to the surface of a ceramic layer not covered by internal electrodes, is significantly greater than in the case of the aforementioned conventional components. This has the result that the ceramic base body demonstrates increased mechanical stability and, therefore, also increased pulse resistance.

In the case of a variant of the component according to the invention, the contact surfaces are arranged on opposite faces of the ceramic base body. In this arrangement, the internal electrodes arranged on the first ceramic layer are connected with the same contact surface, in each instance. This means that the internal electrodes are connected with the other contact surface on the adjacent second ceramic layer, in each instance. In this construction of the component according to the invention, internal electrodes arranged on different ceramic layers therefore overlap, in each instance, wherein the internal electrodes on one layer are connected with the same contact layer, in each instance, and the overlapping internal electrodes of the adjacent layer are connected with the other contact surface, in an electrically conductive manner (see FIGS. 3A and 3B).

In another variant of the invention, the contact surfaces are also arranged on opposite faces of the ceramic base body, where the internal electrodes are, however, connected with different contact surfaces, in each instance. These internal electrodes overlap with internal electrodes on the adjacent second ceramic layer, in each instance, which are connected with the other contact surface, in each instance (see FIGS. 4A and 4B).

In another embodiment of the invention, the ceramic base body can be an alternating arrangement of several first and second ceramic layer regions. In this way, it is possible to construct large ceramic base bodies having a plurality of overlapping internal electrodes having different polarity.

In another advantageous embodiment of the invention, the main axes of overlapping internal electrodes are made to maximally cover one another, so that the internal electrodes overlap maximally. In this arrangement, the main axes indicate the preferred direction of the greatest expanse of an internal electrode. The internal electrodes are advantageously configured as electrode surfaces, in order to produce the greatest possible overlap area.

The ceramic base body of the component according to the invention advantageously comprises a varistor ceramic. In this case, the electrical properties, in other words, the varistor effect, are determined by those ceramic volume regions of the component that are arranged between overlapping internal electrodes having different polarity. Since, in the case of the component according to the invention, a plurality of internal electrodes can be overlapped, it is, as a result, possible to implement a varistor having a large proportion of ceramic volume regions that lie between overlapping internal electrodes. Such components demonstrate an increased capacitance and pulse resistance.

In the following, the invention will be explained in greater detail, using exemplary embodiments and figures.

DESCRIPTION OF THE DRAWINGS

FIGS. 1A and 1B show a cross-section and a longitudinal section through a conventional component having overlapping internal electrodes.

FIGS. 2A and 2B show a cross-section and a longitudinal section through a component according to the state of the art, having non-overlapping internal electrodes.

DETAILED DESCRIPTION

Figure 3A:
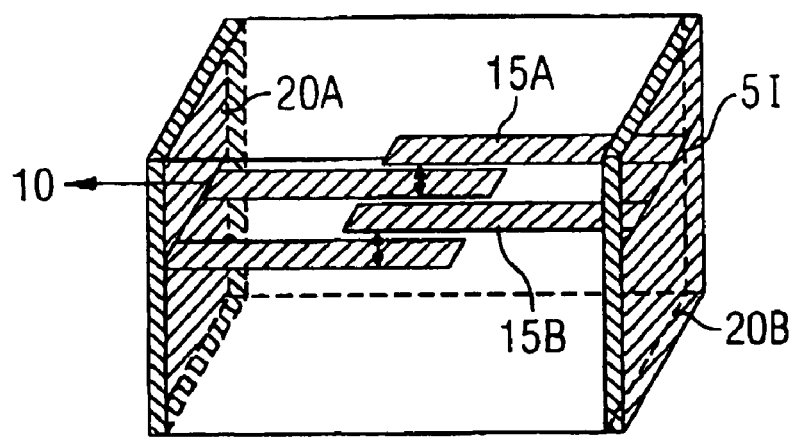
FIGS. 3A and 3B show a perspective view of and a longitudinal section through a variant of a component according to the invention.

FIG. 1A shows a cross-section through a conventional component having a component base body 1. It can be seen that internal electrodes 15, which are arranged on adjacent ceramic layers 5 and 10, overlap. The internal electrodes contact different contact surfaces 20A and 20B, in each instance. FIG. 1B shows a longitudinal section through the ceramic layer 10 referenced as I in FIG. 1A. It can be seen that in this ceramic layer 10, the cross-section of the ceramic layer is very greatly reduced, and therefore weakened, by means of the internal electrode 15. Such a component therefore demonstrates reduced mechanical stability, which also has a negative effect on the pulse resistance of the component.

FIG. 2A shows a cross-section through a conventional component, in which two internal electrodes are present per ceramic layer 5 and 10, respectively. These internal electrodes are an integral part of electrode bundles 25A and 25B, in each instance, which bundles contact a different contact surface 20A and 20B, in each instance, and stand opposite one another in the component, without overlapping. Because of the lack of overlap of the electrode bundles, insufficient portions of ceramic volume regions that lie between internal electrodes having different polarity are present in a component having this construction, in order to be able to absorb high-energy electrical pulses. FIG. 2B shows a longitudinal section through the ceramic layer 10 that is referenced as I in FIG. 2A. It can be seen that two internal electrodes 15A and 15B stand opposite one another and contact different contact surfaces 20A and 20B, in each instance.

Figure 3B:
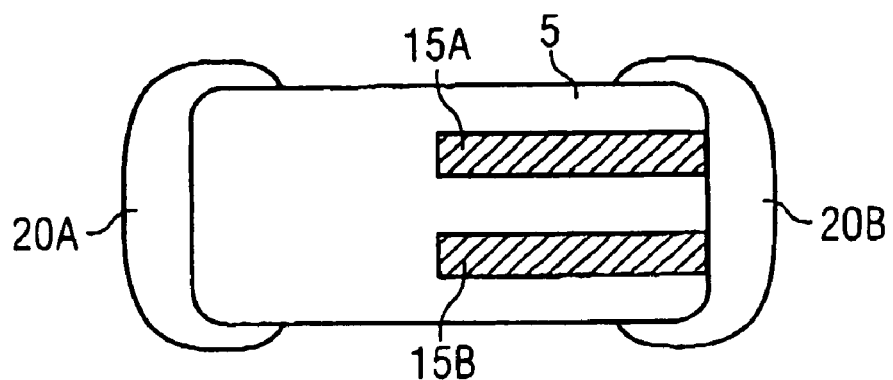

FIG. 3A shows a perspective view of a first variant of the component according to the invention. It can be seen that two internal electrodes 15A and 15B are present, in each instance, on two adjacent ceramic layers 5 and 10, respectively, wherein the two internal electrodes that are arranged on one ceramic layer contact the same contact surface. They overlap with internal electrodes arranged on adjacent ceramic layers, which contact different contact surfaces 20A and 20B, in each instance, as is indicated with double arrows in FIG. 3A. Because of the overlap of the internal electrodes having different polarity, a particularly large area is created to absorb the electrical pulses. FIG. 3B shows a longitudinal section through the ceramic layer region 5 referenced as I in FIG. 3A. It can be seen that two internal electrodes 15A and 15B are arranged on this ceramic layer 5, which contact the same contact surface 20B, in each instance. Because of the two internal electrodes on the ceramic layer, an E-shaped cross-section of the ceramic base body occurs here. In comparison with conventional components (see FIG. 1B, for example), this results in a greater cross-sectional area, and thereby in increased mechanical stability of the component base body.

Figure 4A:
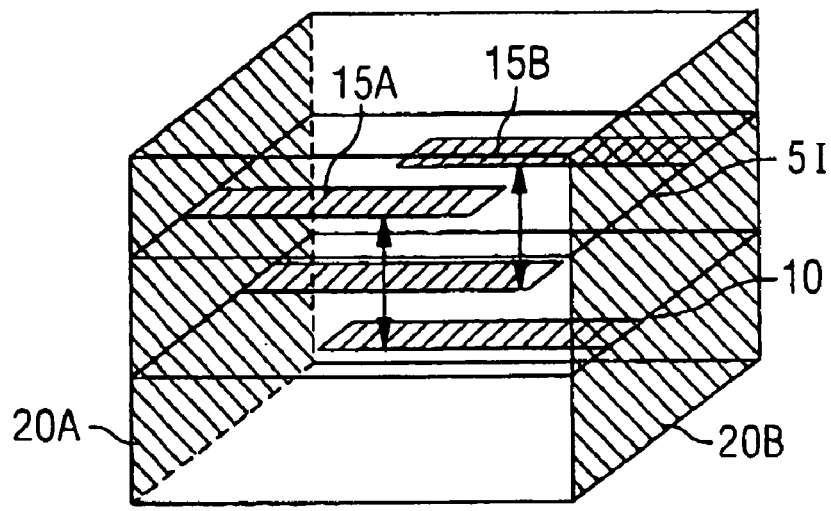
FIGS. 4A and 4B show a perspective view of and a longitudinal section through another variant of the component according to the invention.
Figure 4B:
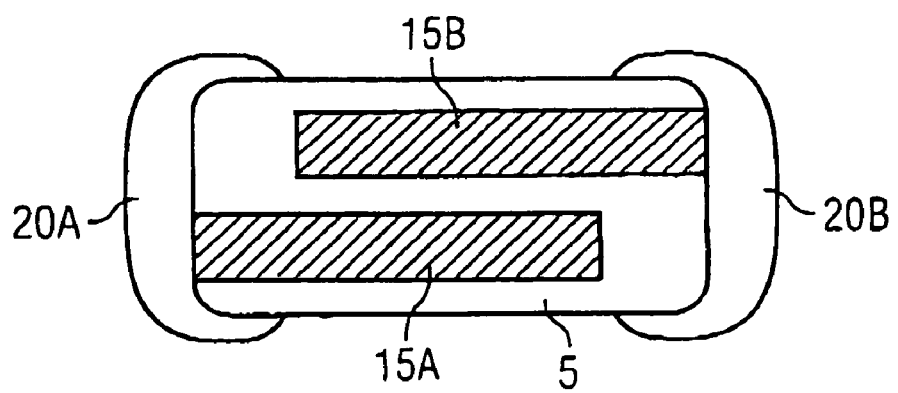

FIG. 4A shows a perspective view of another variant of the component according to the invention. It can be seen that two internal electrodes are arranged, per ceramic layer, on adjacent ceramic layers 5 and 10, respectively, wherein those internal electrode that are arranged on different ceramic layers and demonstrate different polarity, in other words, contact different contact surfaces, overlap. The overlap is schematically shown by the double arrows in FIG. 4A. FIG. 4B shows a longitudinal section through the ceramic layer 5 referenced as I in FIG. 4A. It can be seen that two internal electrodes 15A and 15B, which contact different contact surfaces 20A and 20B, in each instance, are arranged on this layer. As a consequence of this, an S-shaped cross-section of the ceramic layer 5 occurs in this region. In the case of this variant, as well, the cross-sectional area of the ceramic base body is greater in each ceramic layer, while, at the same time, the internal electrodes overlap, than in the case of conventional components, so that increased mechanical stability and thereby also increased pulse resistance are achieved.

The components according to the invention can be produced, in a particularly advantageous manner, via multi-layer technology. In this arrangement, the ceramic base body is produced by stacking ceramic green films on one another. In this case, the internal electrodes can be applied by printing on the ceramic green films. In this process, at least two internal electrodes are present per ceramic layer, according to the invention, which are separated from one another by an unprinted region, so that they do not overlap, and a large cross-section of the ceramic body is achieved in this region.

Varistors according to the invention, having a varistor voltage of 22 to 24 volts, were subjected to electrical pulses of up to 50 joules. In this arrangement, test measurements showed that the varistor voltage in the ceramic base body does not change, which is a clear indication that the base body was not damaged by the electrical pulses.

The invention is not limited to the exemplary embodiments listed here. Other variations of the component according to the invention are possible, particularly with regard to the number of internal electrodes per ceramic layer.

The invention claimed is:

1. An electrical component comprising:
    a ceramic base comprising ceramic layers;
    first and second electrode levels between the ceramic layers, each of the first and second electrode levels comprising at least two electrodes, the first and second electrode levels being adjacent but separated by ceramic; and
    contact surfaces on an outer surface of the ceramic base, the contact surfaces being electrically connected to electrodes, wherein at least two electrodes on a same electrode level are directly connected to different contact surfaces;

wherein electrodes on the first and second electrode levels overlap, the electrodes that overlap being connected to different contact surfaces.

2. The electrical component of claim 1, wherein the contact surfaces are on substantially opposite faces of the ceramic base.

3. The electrical component of claim 1, wherein electrodes that overlap each have areas and a majority of the areas overlap.

4. The electrical component of claim 1, wherein the electrodes are substantially flat.

5. The electrical component of claim 1, wherein the ceramic base comprises a varistor ceramic.

6. The electrical component of claim 1, wherein the first and second electrode levels alternate in the ceramic base, the first electrode level comprising a first electrode that connects to a first contact surface and a second electrode that connects to a second contact surface, the second electrode level comprising a third electrode that connects to the first contact surface and a fourth electrode that connects to the second contact surface, the first and fourth electrodes overlapping and the second and third electrodes overlapping.

7. The electrical component of claim 6, wherein the electrodes are substantially flat.

8. An electrical component comprising:
a ceramic base;
first and second contact surfaces on exteriors of the ceramic base; and
electrodes internal to the ceramic base, the electrodes being arranged on levels in the ceramic base, the electrodes comprising:
 a first electrode on a first level connected to the first contact surface but not to the second contact surface;
 a second electrode on the first level connected to the first contact surface but not to the second contact surface the first and second electrodes comprising separate electrodes;
 a third electrode on a second level connected to the second contact surface but not to the first contact surface, at least part of the third electrode being below the first electrode; and
 a fourth electrode on the second level connected to the second contact surface but not to the first contact surface, the third and fourth electrodes comprising separate electrodes, at least part of the fourth electrode being below the second electrode;
wherein the first and second levels are adjacent to each other in the ceramic base and are separated by ceramic.

9. The electrical component of claim 8, wherein the first and second contact surfaces are on substantially opposite sides of the ceramic base.

10. The electrical component of claim 8, wherein the electrodes are substantially flat.

11. The electrical component of claim 8, wherein the first and third electrode have different polarities and the second and fourth electrodes have different polarities.

12. The electrical component of claim 8, wherein the ceramic base comprises stacked green films.

13. An electrical component comprising:
a ceramic base;
first and second contact surfaces on exteriors of the ceramic base; and
electrodes internal to the ceramic base, the electrodes being arranged on levels in the ceramic base, the electrodes comprising:
 a first electrode on a first level connected to the first contact surface but not to the second contact surface;
 a second electrode on the first level connected to the second contact surface but not to the first contact surface;
 a third electrode on a second level connected to the second contact surface but not to the first contact surface, at least part of the third electrode being below the first electrode; and
 a fourth electrode on the second level connected to the first contact surface but not to the second contact surface, at least part of the fourth electrode being below the second electrode;
wherein the first and second levels are adjacent to each other in the ceramic base and are separated by ceramic.

14. The electrical component of claim 13, wherein the first and second contact surfaces are on substantially opposite sides of the ceramic base.

15. The electrical component of claim 13, wherein the electrodes are substantially flat.

16. The electrical component of claim 13, wherein the first and third electrode have different polarities and the second and fourth electrodes have different polarities.

17. The electrical component of claim 13, wherein the ceramic base comprises stacked green films.

18. The electrical component of claim 13, wherein the ceramic base comprises a varistor ceramic.

19. The electrical component of claim 1, wherein at least two electrodes on a same electrode level are connected to a same contact surface and are not connected to any other contact surfaces.

* * * * *